INVENTOR
WILLIAM A. HYLAND

June 19, 1945.   W. A. HYLAND   2,378,635
SEEDING ATTACHMENT
Filed April 11, 1942   2 Sheets-Sheet 2
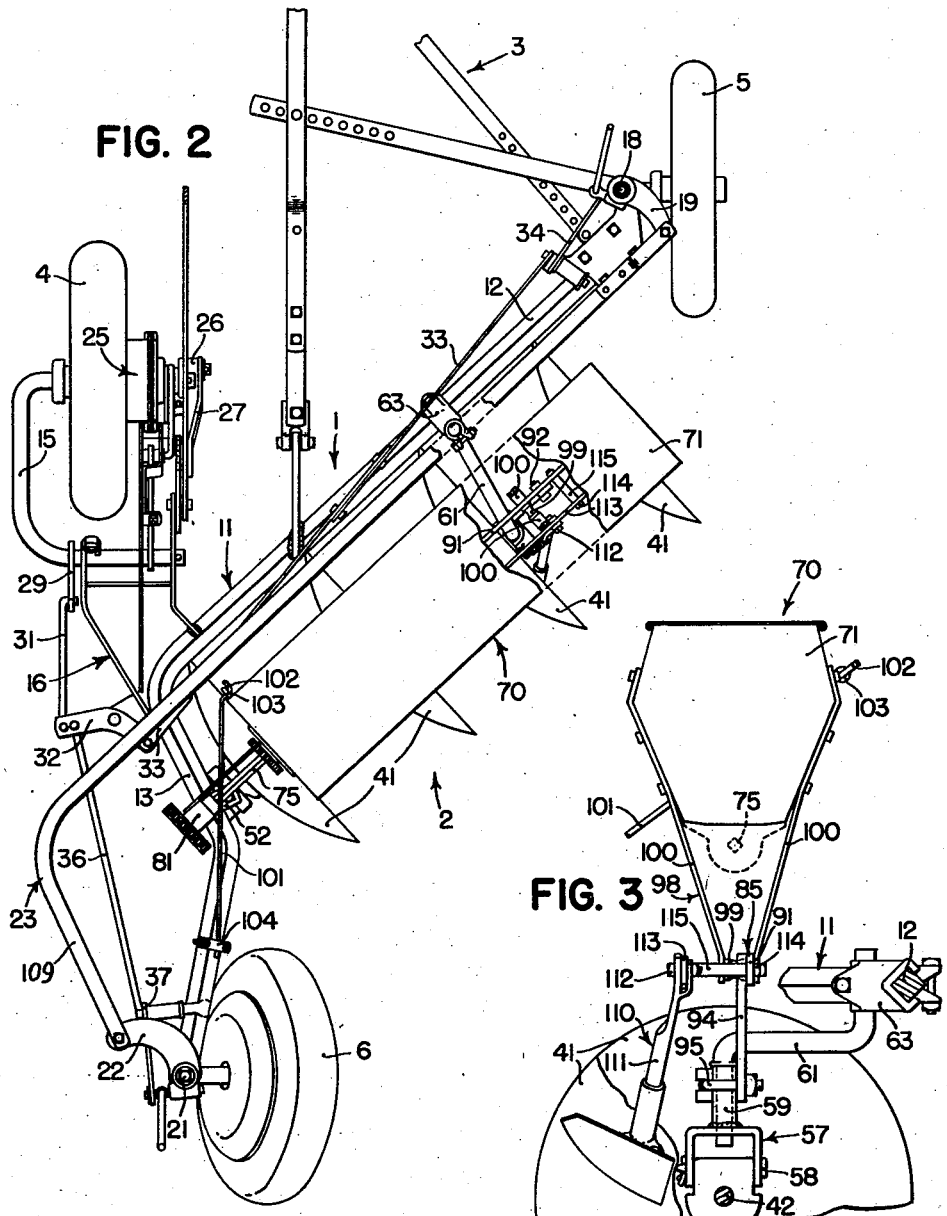
INVENTOR
WILLIAM A. HYLAND Patented June 19, 1945

2,378,635

UNITED STATES PATENT OFFICE 2,378,635

SEEDING ATTACHMENT

William A. Hyland, Horicon, Wis., assignor to The Van Brunt Manufacturing Company, Horicon, Wis., a corporation of Wisconsin Application April 11, 1942, Serial No. 438,636

18 Claims. (Cl. 111—52)

The present invention relates generally to agricultural implements and more particularly to seeding equipment for disk type ground working implements.

The object and general nature of the present invention is the provision of an agricultural implement of the disk type provided with seeding equipment mounted directly on the disk gang and movable therewith when adjusting the latter relative to the implement frame. More particularly, it is a feature of this invention to provide an improved direct mounting for the seeding attachment which is so constructed and arranged that the seeding attachment is supported approximately directly over the disks and is held in this position by means accommodating the movement of the disk gang and the seeding attachment relative to the frame of the implement when adjusting the cutting angle of the disks. A further feature of this invention is the provision of a simple drive from the disk gang to the seeding attachment which also moves with the gang and attachment when adjusting the cutting angle of the disks. By virtue of this construction, a number of parts formerly necessary on prior machines are eliminated.

These and other objects and advantages of the present invention will be apparent to those skilled in the art after a consideration of the following detailed description, taken in conjunction with the accompanying drawings illustrating the preferred embodiment of the invention.

In the drawings:

Figure 2 is a plan view of the implement shown in Figure 1; and

Figure 3 is an end view of the seed box, showing the supporting means therefor and other cooperating parts.

Figure 1:
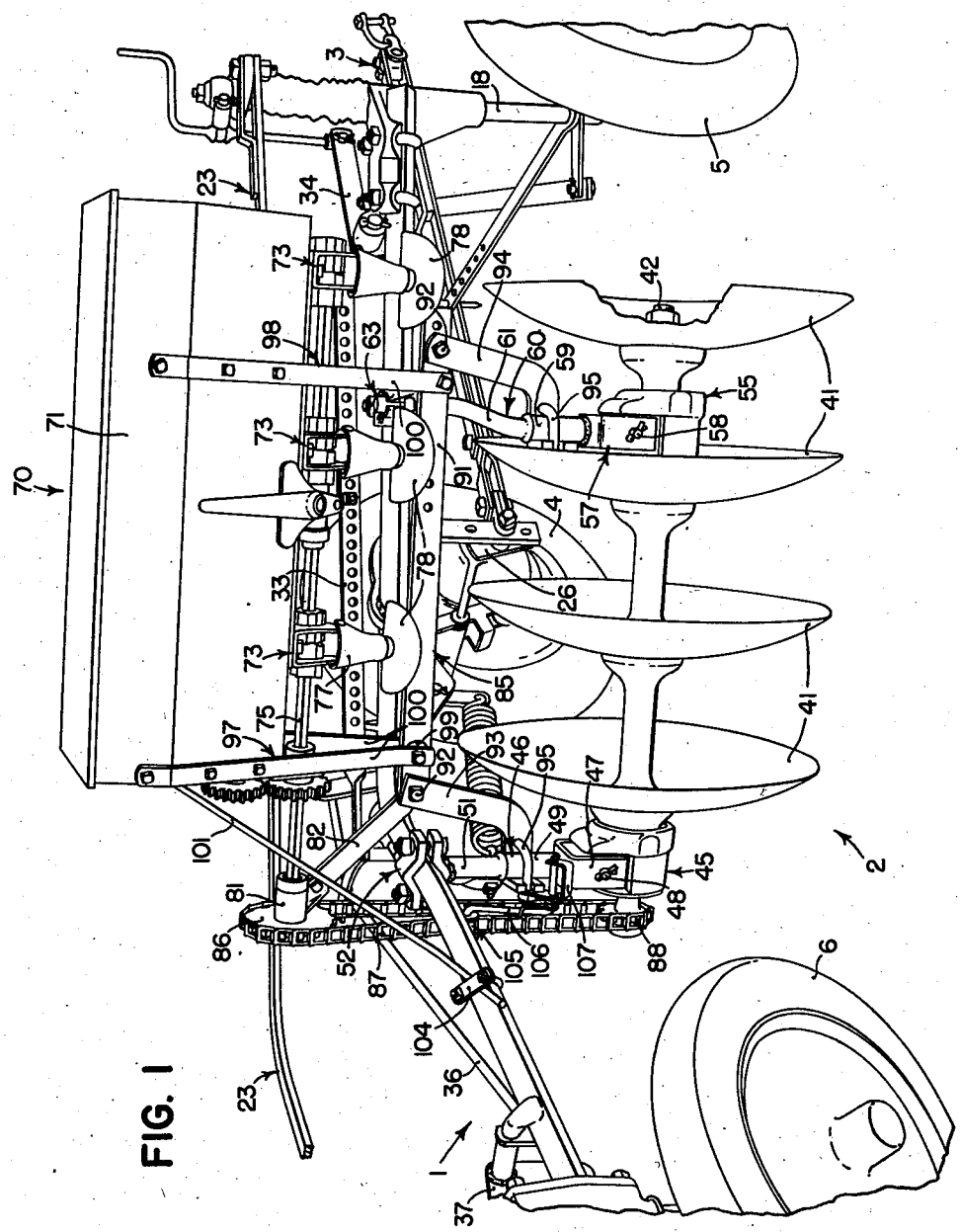
Figure 1 is a perspective rear view of a disk tiller in which the principles of the present invention have been incorporated.

The present invention is shown as incorporated in a disk tiller that is generally of the type disclosed and claimed in the co-pending United States application, Serial No. 407,549, filed August 20, 1941, by Walter H. Silver, to which reference may be made if necessary. It is to be understood, of course, that the disk tiller represents any kind of agricultural implement, particularly those of the ground working disk type, on which a seeding mechanism in the form of a seeding attachment may be mounted by which seeding may be combined with seed bed preparation, thereby doing two jobs at one time. Briefly, the disk tiller includes a frame structure 1, a gang of disks 2, a hitch device 3 and supporting land and furrow wheels 4, 5 and 6. The tiller is adapted to be hitched to a tractor or other source of power, and the frame 1 of the disk tiller includes a frame bar 11 having a main portion 12 that is disposed generally diagonally and a rear portion 13, the forward part of which extends generally diagonally in the other direction, more or less at a right angle to the section 12. The land wheel 4 is mounted on a generally vertically swingable crank axle 15, the rear portion of which is journaled for rocking movement in a bracket structure 16 welded or otherwise secured to the frame bar 11. The front furrow wheel 5 is mounted at the lower end of a spindle 18 to which a steering arm 19 is fixed in any suitable manner. The rear furrow wheel 6 is also mounted on a generally vertically extending spindle, indicated at 21, and the upper end of the spindle 21 carries a steering arm 22. A link 23 of particular construction connects the steering arm 22 with the front steering arm 19 and will be referred to later. The land wheel 4 carries half-revolution clutch mechanism indicated by the reference numeral 25, which mechanism includes a crank 26 which acts through a link 27 connected at its upper end with the bracket 16, to cause the crank axle 15 to swing generally in a vertical direction to control the raising and lowering of the implement frame 11 relative to the wheels. An arm 29 is fixed to the crank axle 15 and is connected through a link 31 with a bell crank 32. The latter member is connected through a forwardly extending link 33 with a bell crank 34 that is connected with the upper end of the front wheel spindle 18. Another link 36 extends rearwardly from the bell crank 32 to a bell crank 37 that is connected with the rear spindle 21. By this construction, rocking of the crank axle serves to raise and lower the implement relative to its supporting wheels.

The disk gang 2 includes a plurality of soil working disks 41 of conventional construction, the disks being mounted on a gang shaft 42 whereby the disks are supported for simultaneous rotation. The rear end of the gang shaft 42 is supported for rotation in a journal bearing 45 of conventional construction, the journal bearing 45 being connected with the rear section 13 of the frame bar 11 by a vertical standard 46. The standard 46 comprises a yoke 47 having its ends pivoted, as at 48, to the bearing 45 and to which a vertically disposed sleeve 49 is fixed. An arm 51 is clamped, as at 52, to the frame bar 11 and extends downwardly with its lower end received for rocking movement within the vertical sleeve section 49. The front bearing of the disk gang 2 is indicated by the reference numeral 55 and is likewise of conventional construction, being disposed between the two forwardmost disks 41. A yoke 57, similar to the yoke 47, is pivoted, as at 58, to the bearing 55 and likewise includes a vertically extending sleeve 59. The latter member comprises a part of a connecting standard, indicated in its entirety by the reference numeral 60 and which also includes a swingable crank or arm member 61, the rear downturned end of which is disposed for rocking movement in the vertical sleeve section 59. The forward or upturned end of the swinging crank arm 61, is connected for rocking movement in a clamping member 63 that may be shifted to different positions along the frame bar 11 and held in that position, this adjustment providing for disposition of the disk gang 2 at different angles with respect to the line of advance. The swinging of the disk gang 2 is about a vertical axis defined by the arm 51 and the sleeve 49. As explained in more detail in the Silver co-pending application, the clamp 52 may also be loosened and the standard 46 shifted to different positions along the rear section 14 of the frame bar 11.

The seeding attachment, with which the present invention is more particularly concerned, is indicated in its entirety by the reference numeral 70. The seeding attachment includes a container for seed in the form of a seed box 71. The bottom of the seed box 71 is provided with a plurality of openings leading to adjustable gate fluted force feed units 73. The present invention is not particularly concerned with the details of construction of the force feed units 73, and therefore it will suffice to note that the force feed units include fluted members mounted on a rotatable shaft 75 carried just under the seed box 71 by suitable bearing means. The seed delivered by the feeds 73 are discharged through spouts 77 on to distributing plates 78 from which the seed fall by gravity onto the soil worked by the disks 41.

The seeding shaft 75 extends laterally and rearwardly beyond the rear end of the seed box 71 and is supported by a bearing 81 carried at the upper end of a bracket 82 that is fixed to a seed box and scraper carrier that is indicated in its entirety by the reference numeral 85. The carrier will be described later. A sprocket 86 is carried at the rear end of the seeding shaft 75 and is driven by a sprocket chain 87 from a sprocket 88 fixed in any suitable manner to the outer or rear end of the gang shaft 42.

The seed box and scraper carrier 85 comprises a bar 91 extending lengthwise of the disk gang unit 2 and bolted at its ends, as at 92, to a pair of supporting members 93 and 94, each of generally L-shaped construction and secured by a U-bolt 95 to the associated bearing sleeve section, 49 or 59. Preferably, the sprocket bracket 82 is fixed to the end of the carrier bar 91 adjacent the rear supporting member 93. The seed box 71 is supported rigidly on the bar 91 by a pair of brackets 97 and 98, each comprising a pair of strap members 100 bolted at their lower ends to the carrier bar 91, preferably with spacers 99, the bars 100 being securely bolted at their upper ends to the box 71. This disposes the seed box substantially directly above the disks 41. The seed box is reenforced by a rod 101 having its front end formed with a looped portion 102 that is disposed in an eye 103 fixed to the forward landward corner of the box 71. The rod 101 extends downwardly and rearwardly and is adjustably connected to the main frame 11 by means of a clamp 104. It will be noted that the front end of the rod 101 is disposed more or less approximately in line with the axis defined by the sleeve 49 and the downwardly extending frame arm 51. Therefore, when the clamp 63 is loosened to permit the crank arm 61 to swing and thus dispose the disks 41 at a different cutting angle, the seed box 71 moves with the disk gang but only a small amount, if any, of readjustment of the rod 101 relative to the frame bar 11 is necessary. An idler 105 for the chain 87 is mounted on an arm 106 which is swingably supported by a bracket 107 on the rear bearing 45, whereby the chain 87 may be kept tight. Since the seeding shaft 75 is driven directly from the disk gang, and since operation of the lifting clutch 25 serves to raise the entire implement out of contact with the ground, it is not necessary to provide any throwout clutch in the seeding shaft assembly for the reason that raising the disks 41 off the ground automatically terminates any further drive of the seeding mechanism. It will be noted from Figure 1 that the steering bar 23 includes a section 109 bent laterally. This is for the purpose of connecting the front and rear steering arms 19 and 22 but providing space for the seed box 71.

The carrier 85 also provides a convenient support for the scrapers, which are of conventional construction. Each scraper is indicated by the reference numeral 110 and includes an arm 111 pivoted, as at 112, to a bar 113 that is bolted, as at 114 to the bar 91. Preferably, the bar 113 is slotted to receive the bolts 114, whereby the position of the scrapers relative to the associated disks may be adjusted. Spacers 115 dispose the bar 113 in the proper position rearwardly of the bar 91, as best shown in Figures 2 and 3. The scraper assembly is omitted in Figure 1 in order to show the other parts somewhat more clearly.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. An agricultural implement comprising supporting means, a ground working unit, standards carried at opposite ends of said unit, means connected with said standards for movably connecting said unit with said supporting means, and seeding mechanism connected directly with said standards and movable with said unit with respect to said supporting means.

2. An agricultural implement comprising frame means, a gang of disks, means adjustably connecting said gang with said frame, including a pair of vertically extending bearing supports connected with the ends of said gang and means movably connecting the upper ends of said bearing supports with said frame means, and a seed container and seed distributing means connected with the bearing supports so as to move with said gang of disks when the latter is adjusted relative to said frame means.

3. An agricultural implement comprising supporting means, a gang of ground working disks connected with said supporting means for movement relative thereto to vary the angular position of the gang relative to said supporting means, means serving as a pair of generally vertically extending standards carried by said gang and shiftably connected with said supporting means, and a seeding attachment mounted on said standards and movable with said gang relative to said supporting means.

4. An agricultural implement comprising supporting means, a gang of ground working disks, connecting means for connecting said gang to said supporting means in different angular positions, said gang being movable relative to said supporting means about a generally vertical axis, a seeding attachment carried by and movable with said gang, and brace means connected with said supporting means and engaging said seeding attachment adjacent said pivot axis whereby said bracing means is effective in any position of angular adjustment of said gang and seeding attachment relative to said frame means.

5. An agricultural machine comprising supporting frame means, a gang of ground working disks having journal boxes adjacent the ends thereof, generally vertically extending standards connected with said journal boxes, means connecting said gang with said frame means and including parts rockably engaging said standards and providing for angular adjustment of said gang of disks relative to said supporting frame means, a carrier fixed to said standards, and a seeding attachment fixed to said carrier and disposed approximately above said disks, said seeding attachment being adjustable with said gang of disks relative to said supporting frame means.

6. An agricultural implement comprising frame means, a gang of disks, means adjustably connecting said gang with said frame means, including a pair of bearing standards connected with the ends of said gangs and means movably connecting the upper ends of said bearing standards with said frame means, and a seeding attachment mounted on said bearing standards.

7. An agricultural implement comprising frame means, a gang of disks, means adjustably connecting said gang with said frame means, including a pair of bearing standards connected with the ends of said gangs and means movably connecting the upper ends of said bearing standards with said frame means, a carrier connected with said bearing standards and movable with said gang when the latter is adjusted relative to said frame means, and a scraper assembly and seeding attachment mounted on said carrier and movable with said gang relative to said frame means.

8. An agricultural implement comprising frame means including a generally diagonal section and a generally rearwardly extending section, a gang of ground working disks having bearing means adjacent its opposite ends, generally upwardly extending standards carried by said bearing means, means extending between said standards and said sections, respectively, of said frame means for adjustably connecting said gang to said frame means, said gang being swingable generally about the standard connected with said rearwardly extending frame section into different angular positions relative to said frame means, a seeding attachment connected directly with said standards and movable with said gang relative to said frame means about said axis, and a reenforcing brace connected at its rear end with the rear portion of said generally rearwardly extending frame section and with said seeding attachment relatively closely adjacent to said axis, whereby said bracing means is effective in any adjusted position of said gang and seeding attachment relative to said frame means.

9. An agricultural implement comprising a supporting frame, a disk gang, bearings adjacent the ends thereof, means shiftably connecting said bearings with said frame to provide for changing the position of said gang relative to said frame, a carrier separate from the disk gang and mounted on said bearings to move with said gang, and a seeding attachment supported on said carrier and movable with said gang when the latter is shifted relative to said frame.

10. An agricultural implement comprising frame means, a disk gang, a pair of bearings for rotatably supporting said gang, a pair of yokes pivotally connected, respectively, with said bearings for movement relative thereto, supporting means connecting said yokes with said frame means to accommodate movement of said gang relative to said frame means, a pair of supports fixed to said yokes, and a seeding attachment mounted on said pair of supports and movable with said disk gang relative to said frame means.

11. An agricultural implement comprising frame means, a disk gang, a pair of bearings for rotatably supporting said gang, a pair of yokes connected with said bearings, sleeves fixed to said yokes, arm means swiveled in said sleeves and serving to connect said disk gang with said frame means for movement relative to the latter, a pair of supporting arms fixed to said sleeves and extending upwardly above the disks of said gang, a supporting member carried by said last-mentioned arms, and a seeding attachment carried on said supporting member.

12. An agricultural implement comprising supporting means, ground working tool means adapted to be raised and lowered relative to said supporting means, means on the latter for raising and lowering said tool means, seeding means for seeding the ground worked by said tool means, and means for mounting said tool means and seeding means for corresponding adjustment so as to maintain the relation therebetween substantially constant for different positions of said tool means.

13. An agricultural implement comprising wheel supported frame means, ground engaging tool means adjustable relative to said wheel supported frame means, seeding means for seeding the ground worked by said tool means, means for driving said seeding means from said tool means, and means for adjusting the seeding means relative to said supporting means to correspond to the adjustment of said tool means relative to said wheel supported frame means, whereby said driving connection is maintained substantially constant.

14. An agricultural implement comprising supporting frame means, front and rear wheel means therefor, each adjustable relative to said frame means, ground working tool means disposed generally in a line between said wheel means, seeding means disposed generally above said tool means, and a link connecting said wheel means, said link being curved so as to clear said seeding means.

15. An agricultural implement comprising supporting means, a seeding unit including a seed container and seed furrow opening means movable together, means including a generally laterally swingable link connecting one end of said unit with said supporting means, and means shiftably connecting the other end of said unit with said supporting means.

16. In an agricultural apparatus, a supporting member including spaced sections, a gang of soil working tools, a seed container, means shiftably connecting one end of said seed container and one end of said gang with one of said spaced supporting sections, and means shiftably connecting the other end of said seed container and the other end of said gang with the other supporting section, said gang and seed container moving together as a unit.

17. An agricultural implement comprising a supporting frame including a diagonally extending section and a generally fore and aft extending section, a seeding unit including a plurality of seed furrow openers and a seed container disposed above said openers, means shiftably connecting one end of said seeding unit with the diagonal section of said frame, and means shiftably connecting the other end of said unit with the other section of said frame.

18. An agricultural implement comprising a supporting frame including a diagonally extending section and a generally fore and aft extending section, a pair of bearing standards connected, respectively, with said frame sections, a gang of disks supported for rotation in said standards, and a seed container disposed above said disks and supported on said standards.

WILLIAM A. HYLAND.